(12) United States Patent
Tae et al.

(10) Patent No.: US 7,675,743 B2
(45) Date of Patent: Mar. 9, 2010

(54) INFORMATION PROCESSING APPARATUS

(75) Inventors: Gi-hyun Tae, Yongin-si (KR);
Kyung-tae Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 11/565,118

(22) Filed: Nov. 30, 2006

(65) Prior Publication Data
US 2007/0127197 A1 Jun. 7, 2007

(30) Foreign Application Priority Data
Dec. 1, 2005 (KR) ...................... 10-2005-0116560

(51) Int. Cl.
*G06F 1/16* (2006.01)
(52) U.S. Cl. .............................. 361/679.21; 248/274.1; 345/905; 364/708.1
(58) Field of Classification Search ................ 361/681, 361/679.21, 679.22; 248/274.1, 917–924; 312/223.2; 345/905; 364/708.1
See application file for complete search history.

(56) References Cited

U.S. PATENT DOCUMENTS

| | | | | |
|---|---|---|---|---|
| 5,923,528 A | * | 7/1999 | Lee ............................. | 361/681 |
| 5,941,493 A | * | 8/1999 | Cheng ......................... | 248/371 |
| 5,997,493 A | * | 12/1999 | Young .......................... | 602/16 |
| 6,050,535 A | * | 4/2000 | Kang ........................... | 248/371 |
| 6,081,420 A | * | 6/2000 | Kim et al. ............... | 361/679.22 |
| 6,189,842 B1 | * | 2/2001 | Bergeron Gull et al. .. | 248/125.1 |
| 6,189,850 B1 | * | 2/2001 | Liao et al. ............... | 248/292.14 |
| 6,357,712 B1 | * | 3/2002 | Lu ........................... | 248/291.1 |
| 6,421,247 B1 | | 7/2002 | Fuchimukai | |
| 6,437,975 B1 | * | 8/2002 | Huang ........................ | 361/681 |
| 6,443,408 B1 | * | 9/2002 | Hung ....................... | 248/176.1 |

(Continued)

FOREIGN PATENT DOCUMENTS

CN 2662760 12/2004

(Continued)

OTHER PUBLICATIONS

Chinese Letters Patent issued Aug. 5, 2009 in CN Patent No. ZL200610163712.0.

*Primary Examiner*—Hung V Duong
(74) *Attorney, Agent, or Firm*—Stanzione & Kim LLP (57) ABSTRACT

An information processing apparatus having a display panel to display an image thereon, the apparatus including a main body casing which supports the display panel and has a shaft accommodator disposed on a rear part thereof, a stand which is coupled with a rear part of the main body casing to support the main body casing, and a pivoting hinge which pivotably couples the main body casing to the stand, the pivoting hinge comprising a hinge shaft which is formed on a plate surface of the stand and accommodated to the shaft accommodator, a pivoting bracket which is disposed in the main body casing and coupled with the hinge shaft, and an elastic pressing part which elastically presses the pivoting bracket toward an internal surface of the main body casing.

23 Claims, 6 Drawing Sheets

U.S. PATENT DOCUMENTS

| | | | |
|---|---|---|---|
| 6,804,861 B2 * | 10/2004 | Hsu | 16/366 |
| 6,822,857 B2 * | 11/2004 | Jung et al. | 361/681 |
| 7,159,279 B2 * | 1/2007 | Liu et al. | 16/367 |
| 7,237,755 B2 * | 7/2007 | Cho et al. | 248/274.1 |
| 7,593,218 B2 * | 9/2009 | Hwang et al. | 361/679.21 |
| 2003/0075649 A1 * | 4/2003 | Jeong et al. | 248/157 |
| 2004/0239828 A1 | 12/2004 | Cho | |

FOREIGN PATENT DOCUMENTS

| | | |
|---|---|---|
| CN | 2738653 | 11/2005 |
| KR | 1999-30753 | 7/1999 |
| KR | 20-232049 | 5/2001 |
| KR | 10-304190 | 7/2001 |
| KR | 20-305308 | 2/2003 |
| KR | 2004-6992 | 1/2004 |
| KR | 2004-9621 | 1/2004 |
| KR | 2004-96097 | 11/2004 |
| WO | 2005/109151 | 11/2005 |
| WO | 2005/114360 | 12/2005 |

* cited by examiner

INFORMATION PROCESSING APPARATUS

CROSS-REFERENCE TO RELATED APPLICATIONS

This application claims priority under 35 U.S.C. §119(a) from Korean Patent Application No. 2005-0116560, filed on Dec. 1, 2005, in the Korean Intellectual Property Office, the disclosure of which is incorporated herein in its entirety by reference.

BACKGROUND OF THE INVENTION

1. Field of the Invention

The present general inventive concept relates to an information processing apparatus, and more particularly, to an information processing apparatus having an improved hinge configuration.

2. Description of the Related Art

Generally, an information processing apparatus processes various information to provide convenience to a user. For example, the information processing apparatus comprises an MP3 player, a personal digital assistant (PDA), a cell phone, a digital camera, a digital photo frame, and a portable multimedia player (PMP). The information processing apparatus may further comprise a portable computer.

Among the information processing apparatuses, the digital photo frame is installed on an installing surface such as a table or a wall and comprises a display panel which displays an image thereon. Thus, the digital photo frame displays an image which is supplied by a memory card inserted into a slot thereof, without inputting an image, a moving picture or an MP3 file captured by a digital camera, etc. to a computer. That is, a user may play or view a moving picture or image captured by a digital camera or a camcorder. Also, the digital photo frame produces the desired effect as an interior accessory like a photo frame, while displaying an image. The digital photo frame is installed on the installing surface such as a table or a wall and needs to rotate.

Korean Patent First Publication No. 2004-6992, filed on Jan. 24, 2004, describes a pivotable monitor apparatus. The conventional monitor device comprises a monitor main body which displays an image, a base member which supports the monitor main body, a link member whose opposite ends are rotatably coupled with a main hinge and a base hinge, respectively, an auxiliary link member which connects the monitor main body and the base member and is disposed in parallel with the link member, and a main body bracket which is disposed between the monitor main body and the link member. The conventional monitor device further comprises a pivot device which connects the monitor main body and the main body bracket to pivot the monitor main body with respect to the main body bracket. The pivot device comprises a first penetrating part which is formed on a plate surface of the main body bracket, a second penetrating part which is formed on a plate surface of the monitor bracket, at least one washer which is disposed between the first and second penetrating parts, and a rivet which connects the first and second penetrating parts to pivot with respect to each other with a predetermined friction force, and comprises a cable accommodator which is shaped like a hollow tube and accommodates a cable connecting the monitor main body and the base member.

With such a configuration, the monitor main body pivots with respect to the main body bracket by the rivet and the washer.

However, in the conventional monitor device, the pivoting hinge comprises a complex coupling configuration and assembly process. Also, the conventional monitor device may pivot unstably as a pivoting part does not maintain a uniform friction force while pivoting.

SUMMARY OF THE INVENTION

The present general inventive concept provides an information processing apparatus which comprises a pivoting hinge assembled without difficulty and pivots stably.

Additional aspects and/or advantages of the present general inventive concept will be set forth in part in the description which follows and, in part, will be obvious from the description, or may be learned by practice of the present general inventive concept.

The foregoing and/or other aspects and utilities of the present general inventive concept are achieved by providing an information processing apparatus having a display panel to display an image thereon, the apparatus comprising a main body casing which supports the display panel and has a shaft accommodator disposed on a rear part thereof, a stand which is coupled with a rear part of the main body casing to support the main body casing, and a pivoting hinge which pivotably couples the main body casing to the stand, the pivoting hinge comprising a hinge shaft which is formed on a plate surface of the stand and accommodated to the shaft accommodator, a pivoting bracket which is disposed in the main body casing and coupled with the hinge shaft, and an elastic pressing part which elastically presses the pivoting bracket toward an internal surface of the main body casing.

The elastic pressing part may be formed on a plate surface of the pivoting bracket which may be shaped like a plate.

The hinge shaft may comprise a rotation engaging part which is engaged with the shaft accommodator and rotatably guided by the shaft accommodator.

The information processing may further comprise a plurality of position determining pins which are formed on one of a surface of the pivoting bracket and a surface of the hinge shaft toward the other one thereof, and a pin accommodator which is formed on the other one of the pivoting bracket and the hinge shaft to be engaged with the position determining pins.

The information processing apparatus may further comprise a pivoting angle limiting unit which limits a pivoting angle of the display panel within a predetermined angle range with respect to the stand.

The pivoting angle limiting unit may comprise an angle limiting projection which is extended along one of the main body casing and the pivoting bracket, and a limiting projection engaging part which is disposed on the other one of the main body casing and the pivoting bracket to be engaged with the angle limiting projection and to limit a pivoting operation of the display panel within the predetermined angle range.

The information processing apparatus may further comprise a pivoting angle keeping unit which keeps the display panel at a predetermined angle while pivoting the display panel with respect to the stand.

The pivoting angle keeping unit may comprise an angle keeping projection which is disposed on one of the main body casing and the pivoting bracket toward the other one thereof, and a plurality of angle keeping projection grooves which are disposed on the other one of the main body casing and the pivoting bracket to be engaged with the angle keeping projection.

The main body casing may comprise a bracket accommodator which is formed on the plate surface of the main body casing toward the hinge shaft and pivotably guides the pivoting bracket in contact with the pivoting bracket.

A cable accommodating groove may be respectively formed in the pivoting bracket and the hinge shaft.

The foregoing and/or other aspects and utilities of the present general inventive concept are also achieved by providing an information processing apparatus, including a main body to support a display panel, a stand coupled to the main body to support the main body, and a pivoting hinge to couple the stand to the main body and to guide a pivoting movement of the main body with respect to the stand, the pivoting hinge including an elastic member to elastically press a rear internal surface of the main body during the pivoting movement to stably guide the pivoting movement of the main body.

The pivoting hinge may further comprise a pivoting bracket having the elastic member disposed at the rear internal surface of the main body, and a hinge shaft coupled to the stand to couple with the pivoting bracket.

The elastic member may be integrally formed with the pivoting bracket.

The elastic member may be bent toward the rear internal surface of the main body from an external circumferential part of the pivoting bracket, and the distance between the elastic member and a surface of the pivoting bracket may increase toward an end part of the circumferential part.

The pivoting bracket may comprise a polycarbonate material.

The pivoting bracket may comprise a glass fiber 20% resin material.

The main body may comprise a bracket accommodator formed on the rear internal surface of the main body to accommodate the pivoting bracket and to guide the pivoting movement of the main body.

The stand may comprise a shaft accommodator formed on a surface of the hinge shaft facing a rear surface of the main body to engage a rotation engaging part formed on one of the rear surface of the main body and the pivoting bracket to stably guide the pivoting movement of the main body.

The foregoing and/or other aspects and utilities of the present general inventive concept are also achieved by providing an information processing apparatus, comprising a main body to support a display panel, and having a display opening at a forward surface thereof, a stand coupled to the main body to support the main body, and a shaft to couple a rear surface of the main body to the stand and support a pivoting movement of the main body with respect to the stand, the shaft comprising a pivoting bracket disposed at a first side of the rear surface of the main body and fixedly coupled to the shaft, the pivoting bracket comprising an elastic member to elastically press a rear internal surface of the main body during the pivoting movement.

The rear surface of the main body may comprise a bracket accommodator formed on the rear surface of the main body to accommodate the pivoting bracket and to guide the pivoting movement of the main body.

The shaft may comprise a shaft accommodator formed on a surface of the shaft facing the rear surface of the main body to engage a rotation engaging part formed on one of the rear surface of the main body and the pivoting bracket to stably guide the pivoting movement of the main body.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

An information processing apparatus 10 according to the present general inventive concept may comprise information processing apparatuses such as an MP3 player, a digital photo frame, a personal digital assistant (PDA), a cell phone, and a portable multimedia player (PMP). The information processing apparatus 10 may further comprise a display apparatus such as a monitor of a personal computer which displays a signal input from an external signal source, as well as a portable computer. For convenience of description, the digital photo frame will be described as an example of the information processing apparatus 10 according to the present general inventive concept.

Figure 1:
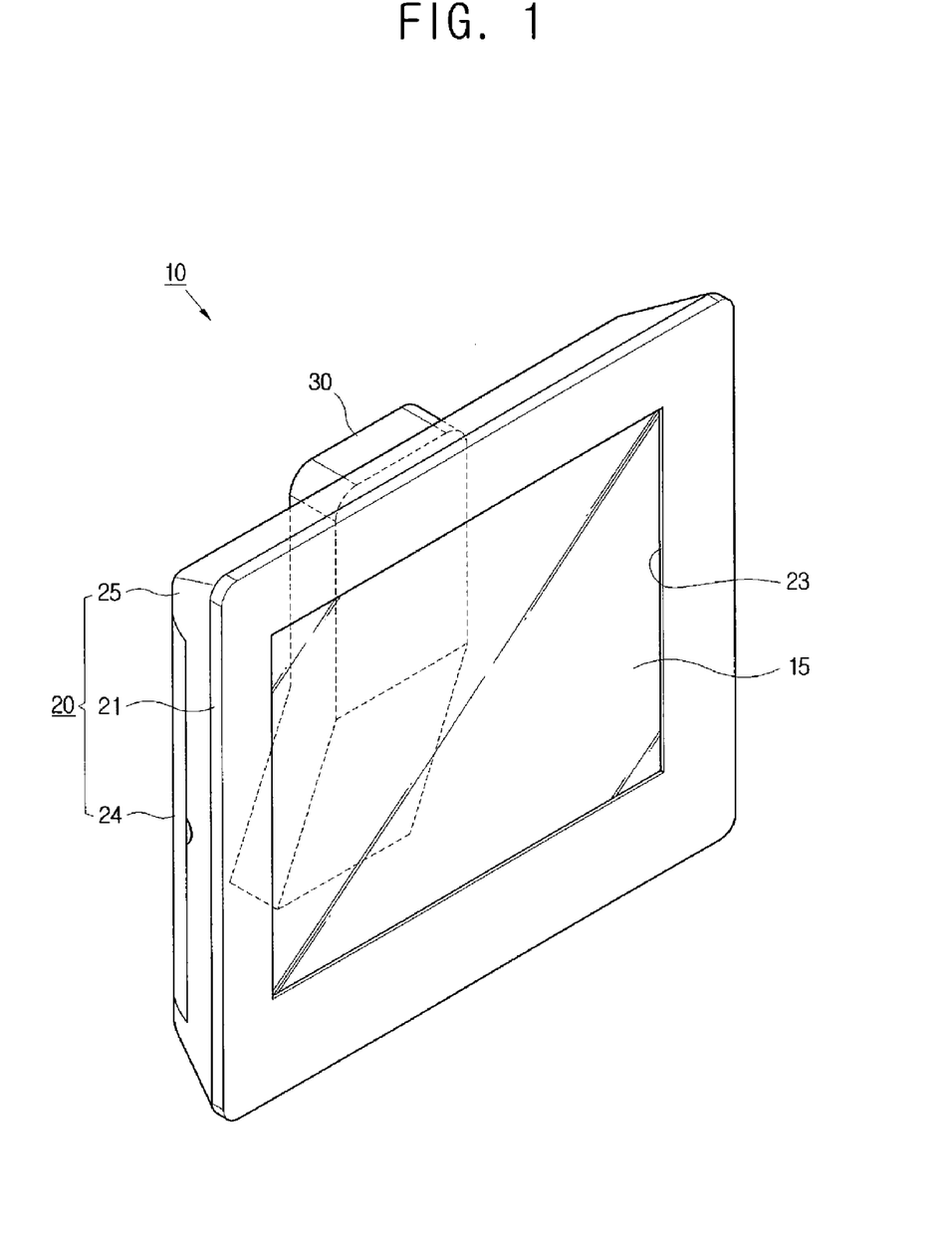
FIG. 1 is a perspective view illustrating an information processing apparatus according to the present general inventive concept.
Figure 2:
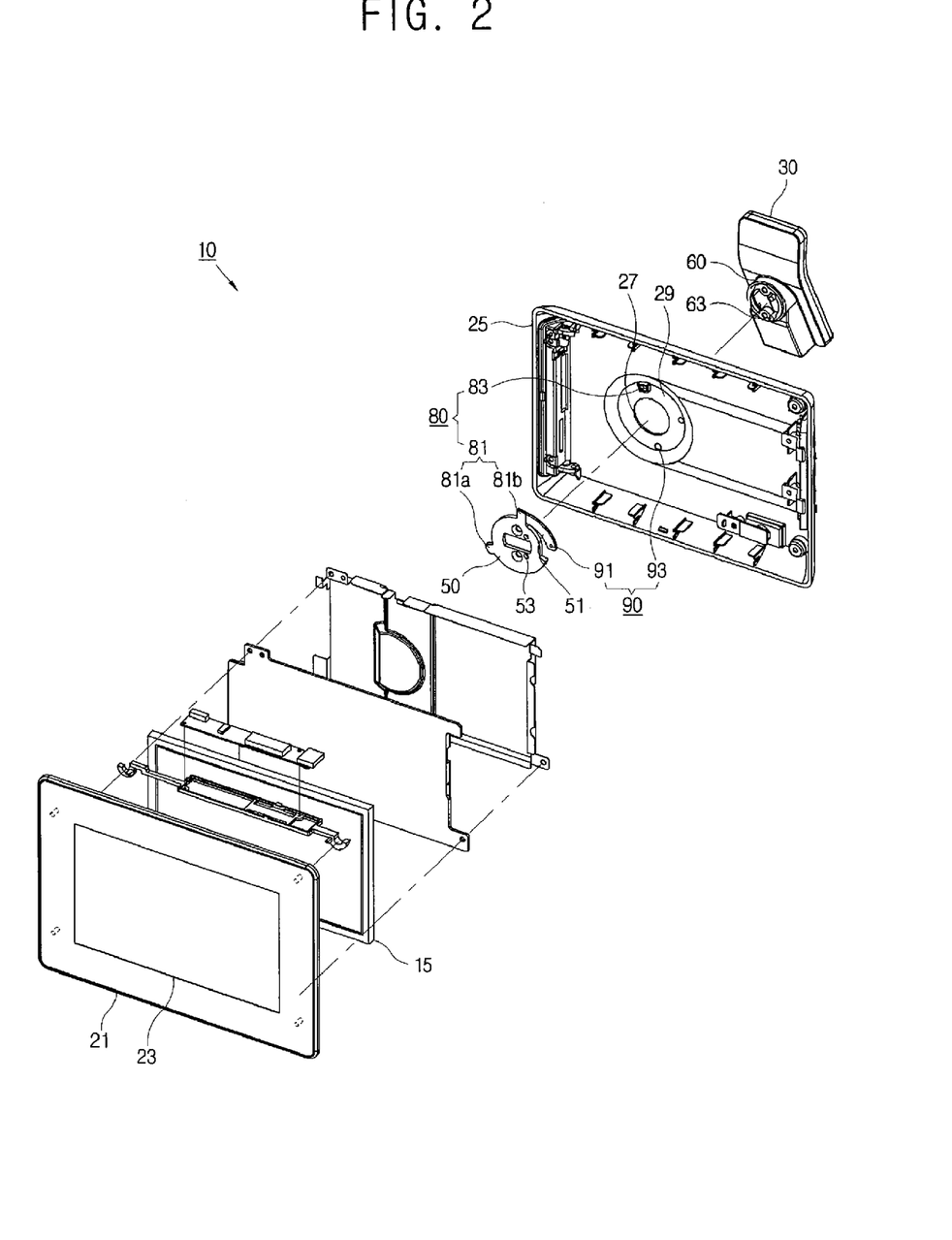
FIG. 2 is an exploded perspective view illustrating the information processing apparatus of FIG. 1.

As illustrated in FIGS. 1 and 2, the information processing apparatus 10 according to an embodiment of the present general inventive concept may comprise a display panel 15 which displays an image thereon, a main body casing 20 which supports the display panel 15 and comprises a shaft accommodator 27 disposed on a rear part thereof; a stand 30 which is coupled with a rear part of the main body casing 20 and supports the main body casing 20, and a pivoting hinge 40 (see FIG. 3A) which is coupled with a rear cover 25 (to be described later) to pivot the main body casing 20 with respect to the stand 30. The pivoting hinge 40 may comprise a hinge shaft 60 which is formed on a plate surface of the stand 30 in a transverse direction and accommodated in the shaft accommodator 27, and a pivoting bracket 50 which is disposed in the main body casing 20 and coupled with the hinge shaft 60. The pivoting bracket 50 is provided with an elastic pressing part 51 which elastically presses the pivoting bracket 50 to separate the pivoting bracket 50 from the main body casing 20.

As illustrated in FIGS. 1 and 2, the display panel 15 may be coupled with a display opening 23 of a front cover 21. The display panel 15 may comprise a liquid crystal display (LCD), a plasma display panel (PDP) and other known display panels. The display panel 15 may provide images in different resolution according to a viewing angle of a user by an image displaying method. The display panel 15 requires a pivoting configuration as it may be installed on a table or a wall in a transverse or lengthwise direction according to picture sizes.

As illustrated in FIG. 2, the main body casing 20 comprises the front cover 21 which supports the display panel 15 and the rear cover 25 which is coupled with the front cover 21, to dispose the display panel 15 therebetween.

The front cover 21 is coupled with the rear cover 25, thereby forming an external appearance of the information processing apparatus 10 together with the display panel 15. The front cover 21 further comprises a mounting slot (not illustrated) which detachably attaches a peripheral device (not illustrated) thereto and a door 24 which rotatably opens and closes to provide access to the mounting slot.

The door 24 may be coupled with the front cover 21 by a hinge and rotatably opens and closes the mounting slot. A shape of the door 24 may correspond to that of the mounting slot.

The rear cover 25 is coupled with the front cover 21, and coupled with the stand 30 and the pivoting hinge 40. The rear cover 25 may comprise the shaft accommodator 27 which is formed thereon and guides a rotation engaging part 61 (see FIG. 3A) of the hinge shaft 60 disposed on the stand 30 to rotate. Thus, the pivoting hinge 40 may stably pivot.

A bracket accommodator 29 can be formed on a plate surface of the main body casing 20 toward the hinge shaft 60 to pivotably guide the pivoting bracket 50 in contact with the hinge shaft 60. Thus, the pivoting bracket 50 is contacted with the main body casing 20 on a relatively large area and slidably and stably pivots.

The stand 30 is coupled with the rear cover 25 and installed on an installing surface, such as a table, to support the main body casing 20. The stand 30 is provided with the hinge shaft 60 which is coupled with the pivoting bracket 50.

Figure 3A:
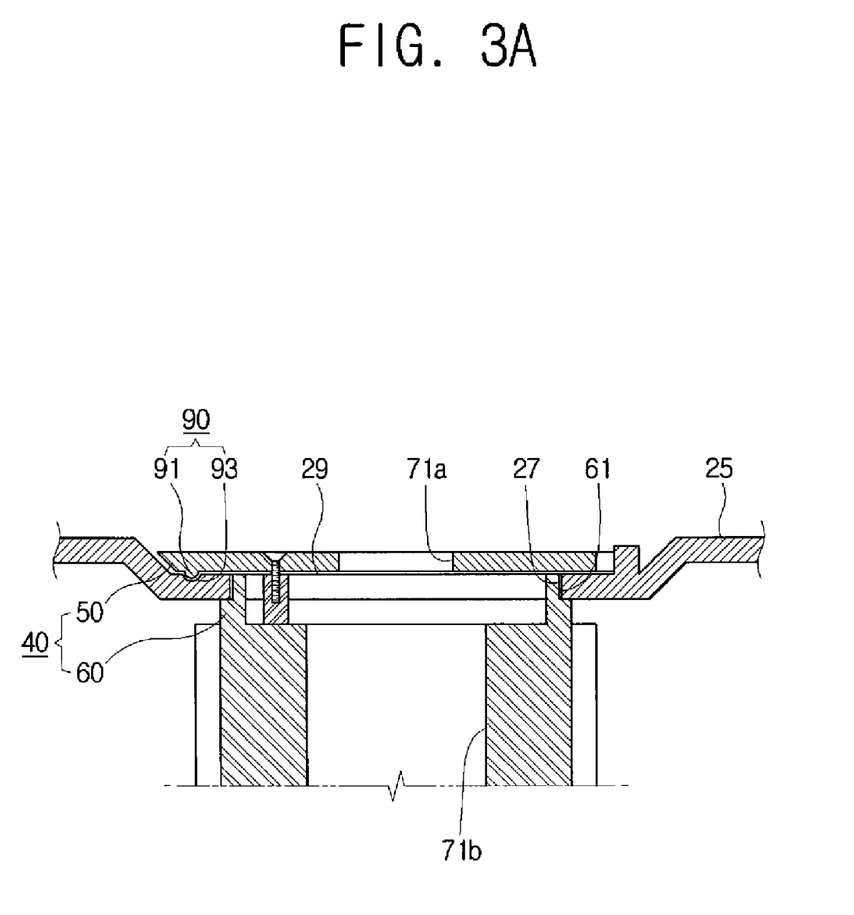
FIG. 3A is a partial sectional view illustrating a pivoting hinge of the information processing apparatus of FIG. 1.

As illustrated in FIGS. 1, 2 and 3A, the pivoting hinge 40 couples the main body casing 20 and the stand 30 to press an internal surface of the main body casing 20 so that the display panel 15 pivots with respect to the stand 30. The pivoting hinge 40 may comprise the pivoting bracket 50 which may be shaped like a plate and may comprise the elastic pressing part 51 which is bent to elastically press the internal surface of the main body casing 20 while pivoting, and the hinge shaft 60 which can be disposed on the stand 30 to be coupled with the pivoting bracket 50. The pivoting hinge 40 may further comprise a pivoting angle limiting unit 80 which limits a pivoting angle of the display panel 15 within a predetermined angle range with respect to the stand 30. The pivoting hinge 40 may further comprise a pivoting angle keeping unit 90 which keeps the display panel 15 at a predetermined angle while pivoting the display panel 15 with respect to the stand 30. Thus, the display panel 15 stably pivots by the pivoting hinge 40. Here, the pivoting bracket 50 may be coupled with the hinge shaft 60 by a fastener such as a screw, etc.

The pivoting bracket 50 may comprise the elastic pressing part 51 and a pin accommodator 53 (to be described later). The pivoting bracket 50 may comprise a material, such as polycarbonate or glass fiber 20% resin, that is hardly deformed at a predetermined test temperature and highly heat-resistant.

Figure 3B:
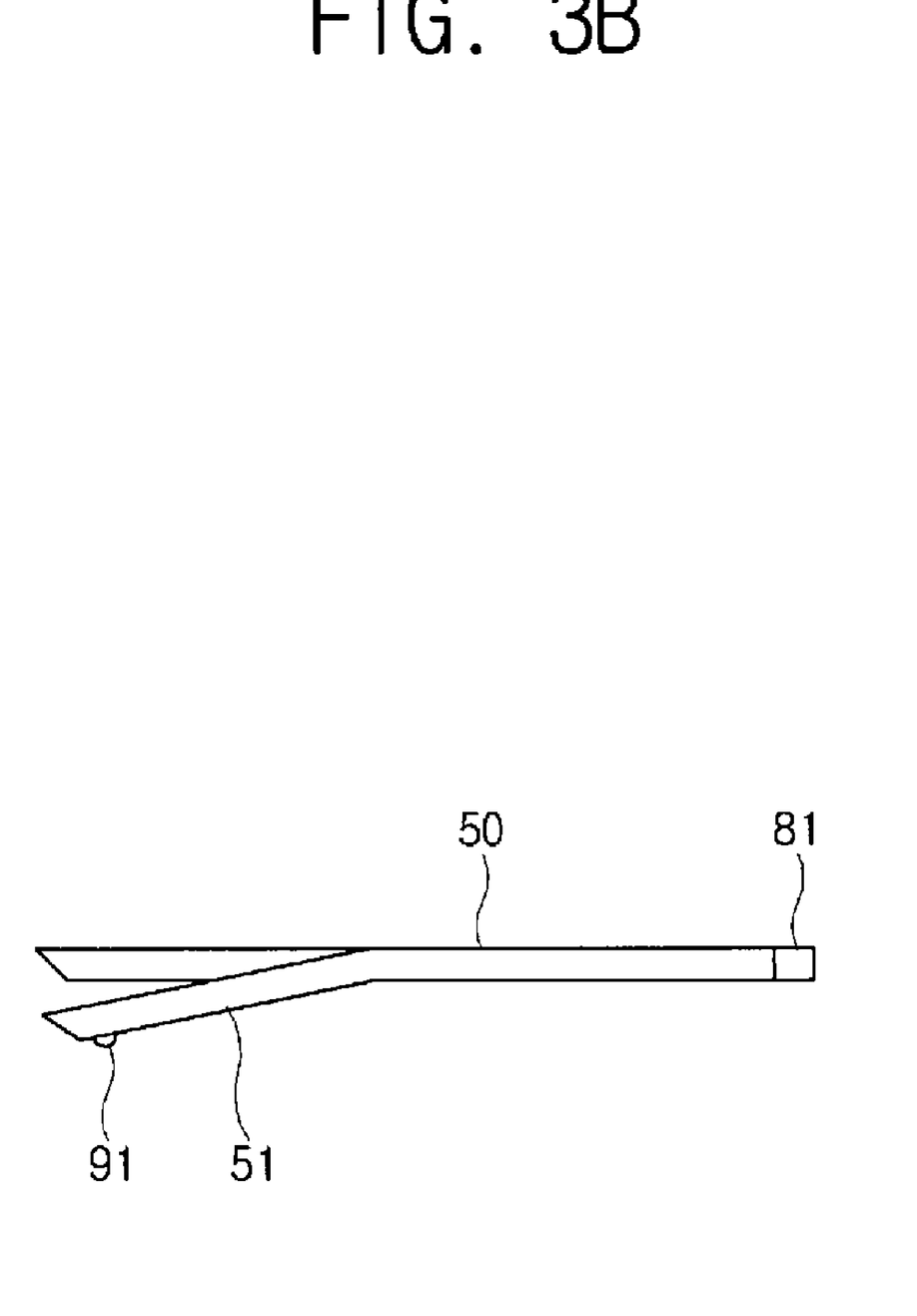
FIG. 3B is a side view illustrating a pivoting bracket of the information processing apparatus of FIG. 1.

As illustrated in FIGS. 2 and 3B, the elastic pressing part 51 is bent from an external circumferential part of the pivoting bracket 50 which is shaped like a plate, and elastically presses an internal surface of the rear cover 25 while pivoting the main body casing 20. The distance between the elastic pressing part 51 and the plate surface of the pivoting bracket 50 increases towards the end part of the circumferential part thereof. Thus, a predetermined friction force is generated while pivoting the display panel 15, thereby stably pivoting the display panel 15. As the elastic pressing part 50 can be integrally formed on the pivoting bracket 50, the elastic pressing part 51 comprises a simple configuration that can be easily assembled and thus reduces productions costs.

The hinge shaft 60 is disposed on the stand 30 and coupled with the pivoting bracket 50. The hinge shaft 60 may comprise a rotation engaging part 61 and a position determining pin 63, which are described later.

As illustrated in FIGS. 1, 2 and 3A, the rotation engaging part 61 can be formed on a plate surface of the hinge shaft 60 facing toward the rear cover 25 of the main body casing 20. Alternatively, the rotation engaging part 61 may be formed on the pivoting bracket 50, and the shaft accommodator 27 may also be formed on the hinge shaft 60. Thus, the rotation engaging part 61 is engaged with the shaft accommodator 27 and pivots the display panel 15 stably.

The position determining pin 63 can be formed on a surface of the hinge shaft 60 facing toward the pivoting bracket 50 to determine a position of the pivoting hinge 40 while assembling. The pin accommodator 53 coupled with the position determining pin 63 can be disposed on the pivoting bracket 50.

As illustrated in FIG. 2, cable accommodating slots 71a and 71b are formed on a central area of the pivoting bracket 50 and of the hinge shaft 60 to accommodate a cable. Thus, power or information/data can be supplied through the cable.

The pivoting angle limiting unit 80 limits the pivoting angle of the display panel 15 to the predetermined angle range with respect to the stand 30. The pivoting angle limiting unit 80 may comprise two angle limiting projections 81a and 81b which are extended along a plate surface of the pivoting bracket 50, and a limiting projection engaging part 83 which is engaged with the angle limiting projections 81a and 81b of the main body casing 20 to limit a pivoting operation of the display panel 15 within the predetermined angle range. Alternatively, the angle limiting projections 81a and 81b and the limiting projection engaging part 83 may be disposed on the main body casing 20 and the pivoting bracket 50, respectively. Thus, the pivoting operation of the main body casing 20 is limited within the predetermined angle range without difficulty.

The pivoting angle keeping unit 90 keeps the display panel 15 at the predetermined angle with respect to the stand 30. The pivoting angle keeping unit 90 comprises an angle keeping projection 91 which is formed on the plate surface of the pivoting bracket 50 toward the main body casing 20, and a plurality of angle keeping projection grooves 93 which may be formed on the main body casing 20 to be engaged with the angle keeping projection 91. The angle keeping projection grooves 93 may have various angle ranges. Alternatively, the angle keeping projection 91 and the angle keeping projection grooves 93 may be disposed on the main body casing 20 and the pivoting bracket 50, respectively. Thus, the main body casing 20 may maintain the pivoting angle thereof without difficulty.

With the foregoing configuration, a process of assembling and pivoting the pivoting hinge 40 of the information processing apparatus 10 according to the present general inventive concept will be described with reference to FIGS. 2, 3A, 4A and 4B.

First, the assembling process of the pivoting hinge 40 will be described. The rotation engaging part 61 of the hinge shaft 60 disposed on the stand 30 is inserted into the shaft accommodator 27 of the rear cover 25. The position determining pin 63 of the hinge shaft 60 is engaged with the pin accommodator 53 of the pivoting bracket 50 to couple the pivoting bracket 50 and the hinge shaft 60. Then, the front cover 21 is coupled with the rear cover 25 to finish the assembling process of the information processing apparatus 10.

Figure 4A:
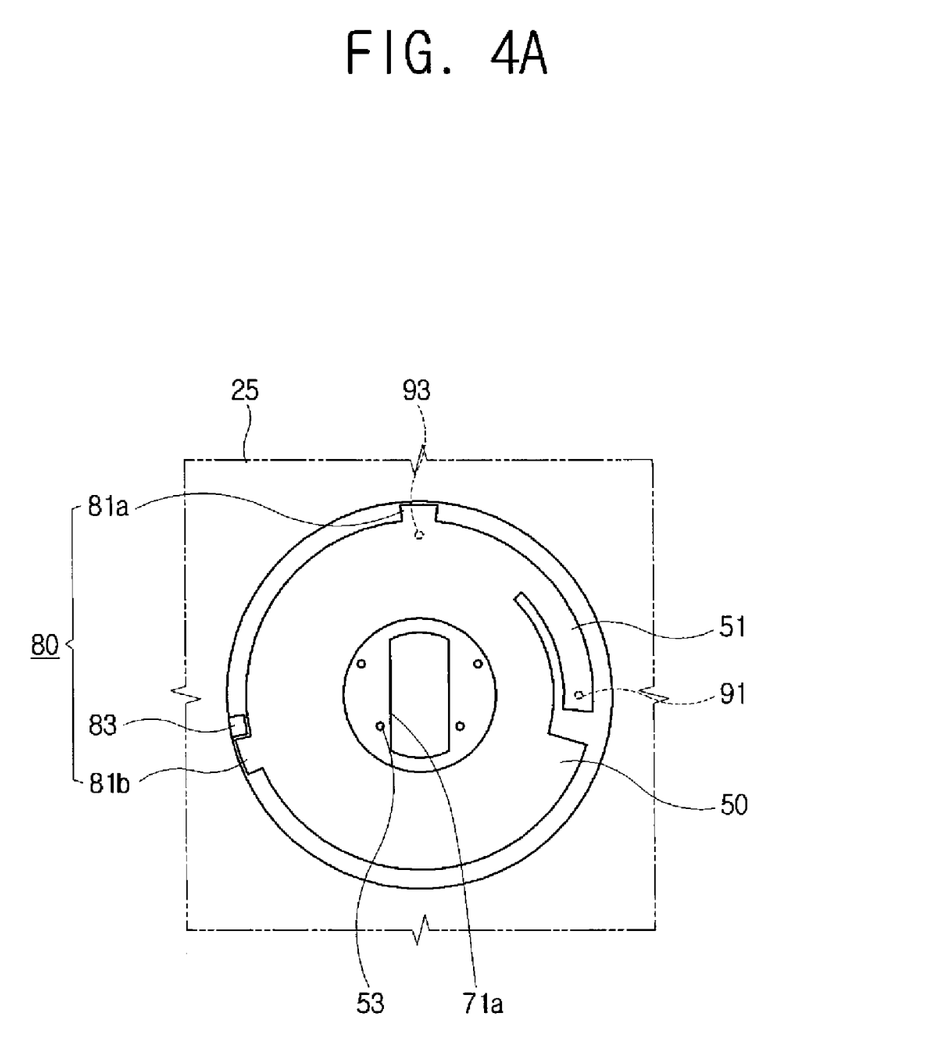
FIGS. 4A and 4B illustrate a pivoting process of the pivoting hinge of the information processing apparatus of FIG. 1.
Figure 4B:
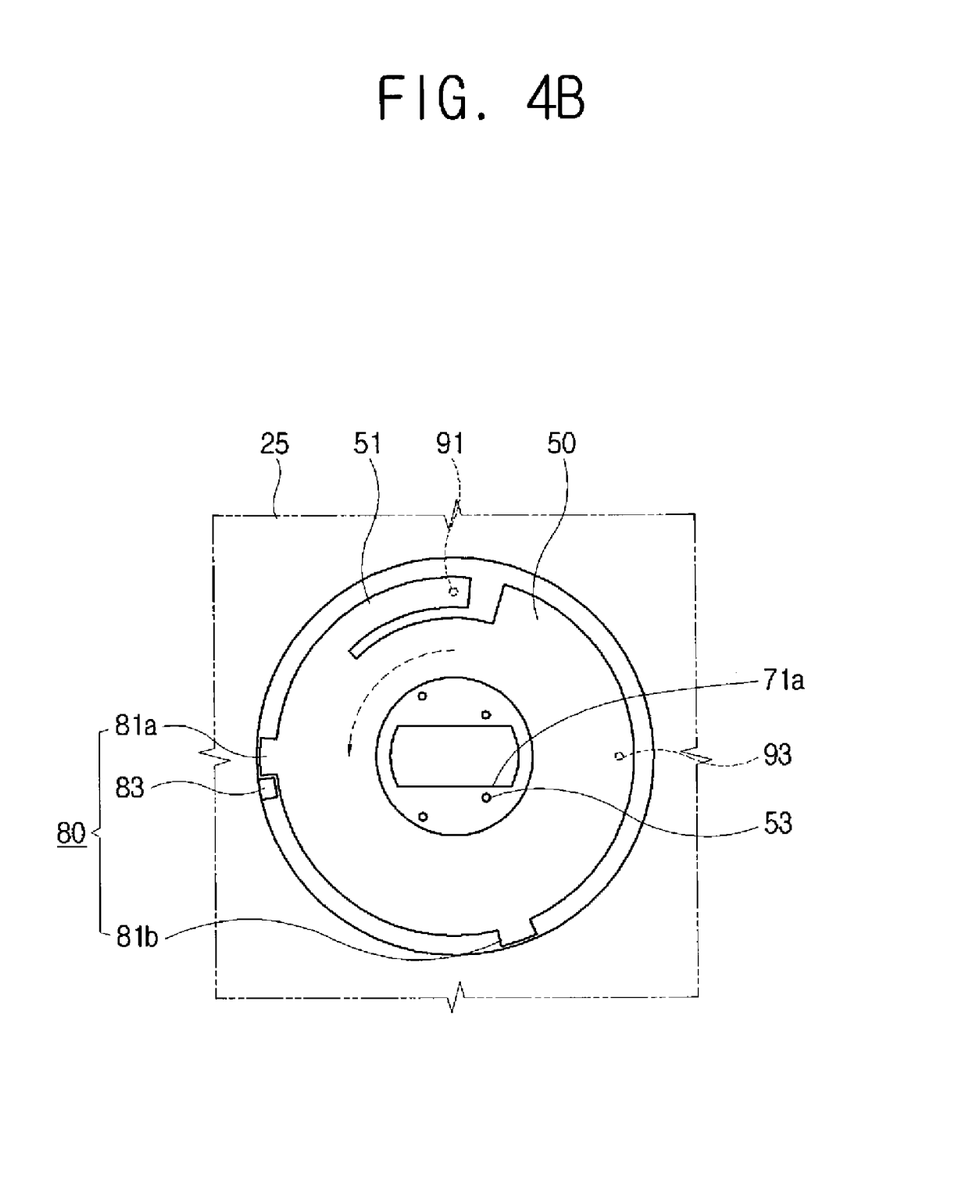

Hereinafter, the pivoting process of the main body casing 20 will be described. The display panel 15 is installed on an installing surface in a transverse direction (refer to FIG. 4A). As illustrated in FIG. 4B, a user may pivot the display panel 15 by an angle of 90° in a lengthwise direction. Then, the elastic pressing part 51 of the pivoting bracket 50 presses the main body casing 20. The shaft accommodator 27 guides the rotation engaging part 61 to rotate. Thus, the main body casing 20 pivots stably with respect to the stand 30. The pivot angle limiting unit 80 limits the pivoting operating of the main body casing 20 within the predetermined angle range. The pivot angle keeper 90 keeps the main body casing 20 at the predetermined angle.

While the digital photo frame is provided as an example of the information processing apparatus of FIG. 1 the present general inventive concept is not limited thereto, and the general inventive concept can be applicable to other types of information processing apparatuses as well as to portable information processing apparatuses such as a PDA or a PMP.

According to the present general inventive concept, the pivoting hinge comprises a simple assembly configuration. As a predetermined friction force is uniformly generated, an information processing apparatus can stably pivot and can be assembled without difficulty, thereby reducing production costs. Also, a pivoting angle of the information processing apparatus can be limited within a predetermined angle range and kept at a predetermined angle.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An information processing apparatus having a display panel to display an image thereon, the apparatus comprising:
   a main body casing which supports the display panel and has a shaft accommodator disposed on a rear part thereof;
   a stand which is coupled with a rear part of the main body casing to support the main body casing; and
   a pivoting hinge which pivotably couples the main body casing to the stand, the pivoting hinge comprising:
      a hinge shaft which is formed on a plate surface of the stand and accommodated to the shaft accommodator,
      a pivoting bracket which is disposed in the main body casing and coupled with the hinge shaft, and
      an elastic pressing part which elastically presses the main body casing at a rear internal surface thereof.

2. The information processing apparatus according to claim 1, wherein the elastic pressing part is formed on a plate surface of the pivoting bracket which is shaped like a plate.

3. The information processing apparatus according to claim 2, further comprising:
   a pivoting angle keeping unit which keeps the display panel at a predetermined angle while pivoting the display panel with respect to the stand.

4. The information processing apparatus according to claim 3, wherein the pivoting angle keeping unit comprises:
   an angle keeping projection which is disposed on one of the main body casing and the pivoting bracket toward the other one thereof; and
   a plurality of angle keeping projection grooves which are disposed on the other one of the main body casing and the pivoting bracket to be engaged with the angle keeping projection.

5. The information processing apparatus according to claim 1, wherein the hinge shaft comprises a rotation engaging part which is engaged with the shaft accommodator and rotatably guided by the shaft accommodator.

6. The information processing apparatus according to claim 1, further comprising:
   a plurality of position determining pins which are formed on one of a surface of the pivoting bracket and a surface of the hinge shaft facing toward the other one thereof; and
   a pin accommodator which is formed on the other one of the pivoting bracket and the hinge shaft to be engaged with the position determining pins.

7. The information processing apparatus according to claim 1 further comprising:
   a pivoting angle limiting unit which limits a pivoting angle of the display panel within a predetermined angle range with respect to the stand.

8. The information processing apparatus according to claim 7, wherein the pivoting angle limiting unit comprises:
   an angle limiting projection which is extended along one of the main body casing and the pivoting bracket; and
   a limiting projection engaging part which is disposed on the other one of the main body casing and the pivoting bracket to be engaged with the angle limiting projection and to limit a pivoting operation of the display panel within the predetermined angle range.

9. The information processing apparatus according to claim 1, wherein the main body casing comprises:
   a bracket accommodator which is formed on the plate surface of the main body casing toward the hinge shaft and pivotably guides the pivoting bracket in contact with the pivoting bracket.

10. The information processing apparatus according to claim 1, wherein a cable accommodating slot is respectively formed in the pivoting bracket and in the hinge shaft.

11. An information processing apparatus, comprising:
    a main body to support a display panel;
    a stand coupled to the main body to support the main body; and
    a pivoting hinge to couple the stand to the main body and to guide a pivoting movement of the main body with respect to the stand, the pivoting hinge including an elastic member to elastically press the main body at a rear internal surface thereof during the pivoting movement to stably guide the pivoting movement of the main body.

12. The apparatus of claim 11, wherein the pivoting hinge further comprising:
    a pivoting bracket having the elastic member disposed at the rear internal surface of the main body; and
    a hinge shaft coupled to the stand to couple with the pivoting bracket.

13. The apparatus of claim 12, wherein the elastic member is integrally formed with the pivoting bracket.

14. The apparatus of claim 13, wherein the elastic member is bent toward the rear internal surface of the main body from an external circumferential part of the pivoting bracket, and the distance between the elastic member and a surface of the pivoting bracket increases toward an end part of the circumferential part.

15. The apparatus of claim 13, wherein the pivoting bracket comprises a polycarbonate material.

16. The apparatus of claim 13, wherein the pivoting bracket comprises a glass fiber 20% resin material.

17. The apparatus of claim 12, wherein the main body comprises:

a bracket accommodator formed on the rear internal surface of the main body to accommodate the pivoting bracket and to guide the pivoting movement of the main body.

18. The apparatus of claim 12, wherein the stand comprises:

a shaft accommodator formed on a surface of the hinge shaft facing a rear surface of the main body to engage a rotation engaging part formed on one of the rear surface of the main body and the pivoting bracket to stably guide the pivoting movement of the main body.

19. An information processing apparatus, comprising:

a main body to support a display panel, and having a display opening at a forward surface thereof;

a stand coupled to the main body to support the main body; and a shaft to couple a rear surface of the main body to the stand and support a pivoting movement of the main body with respect to the stand, the shaft comprising:

a pivoting bracket disposed at a first side of the rear surface of the main body and fixedly coupled to the shaft, the pivoting bracket comprising an elastic member to elastically press the main body at a rear internal surface thereof during the pivoting movement.

20. The apparatus of claim 19, wherein the rear surface of the main body comprises:

a bracket accommodator formed on the rear surface of the main body to accommodate the pivoting bracket and to guide the pivoting movement of the main body.

21. The apparatus of claim 19, wherein the shaft comprises:

a shaft accommodator formed on a surface of the shaft facing the rear surface of the main body to engage a rotation engaging part formed on one of the rear surface of the main body and the pivoting bracket to stably guide the pivoting movement of the main body.

22. An information processing apparatus, comprising:

a main body to support a display panel;

a stand to support the main body; and a pivoting bracket disposed within the main body and an elastic member disposed within the main body to press the main body at an internal surface thereof during a pivoting movement.

23. The apparatus of claim 22, wherein the elastic member is formed on the pivoting bracket.

* * * * *